No. 795,442.    PATENTED JULY 25, 1905.
A. B. HYDE.
COMBINED HARROW AND CULTIVATOR.
APPLICATION FILED DEC. 29, 1904.
2 SHEETS—SHEET 1.
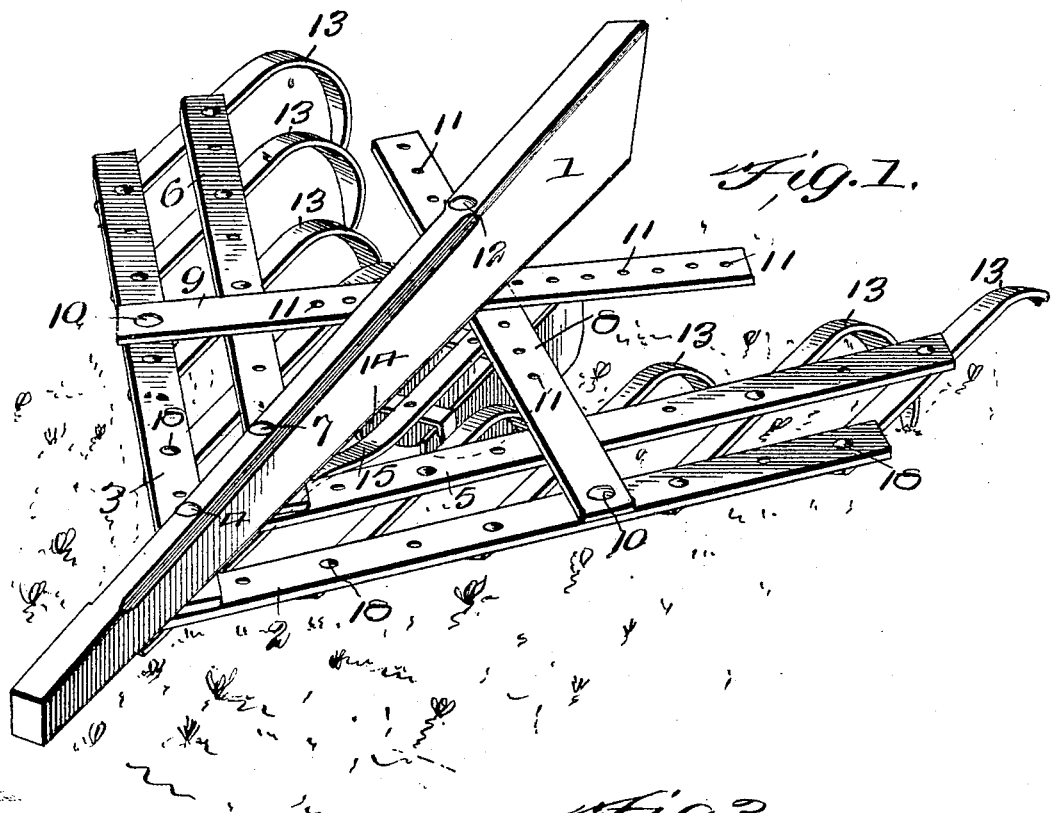
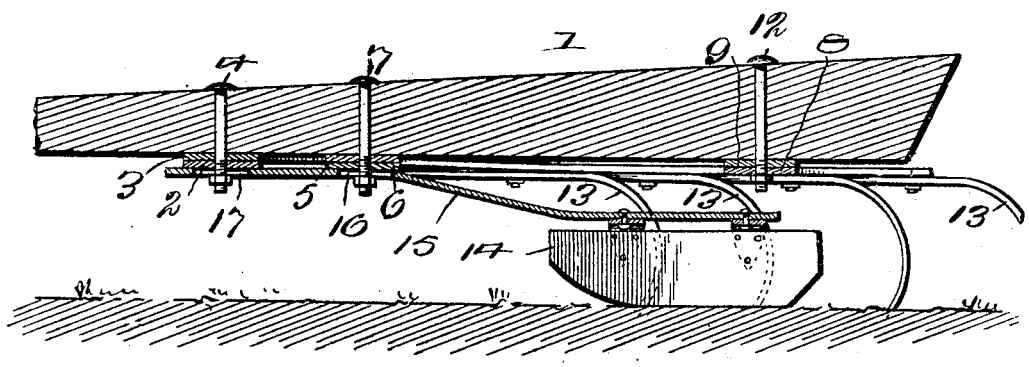
Inventor
Archie B. Hyde No. 795,442. PATENTED JULY 25, 1905.
A. B. HYDE.
COMBINED HARROW AND CULTIVATOR.
APPLICATION FILED DEC. 29, 1904.
2 SHEETS—SHEET 2.
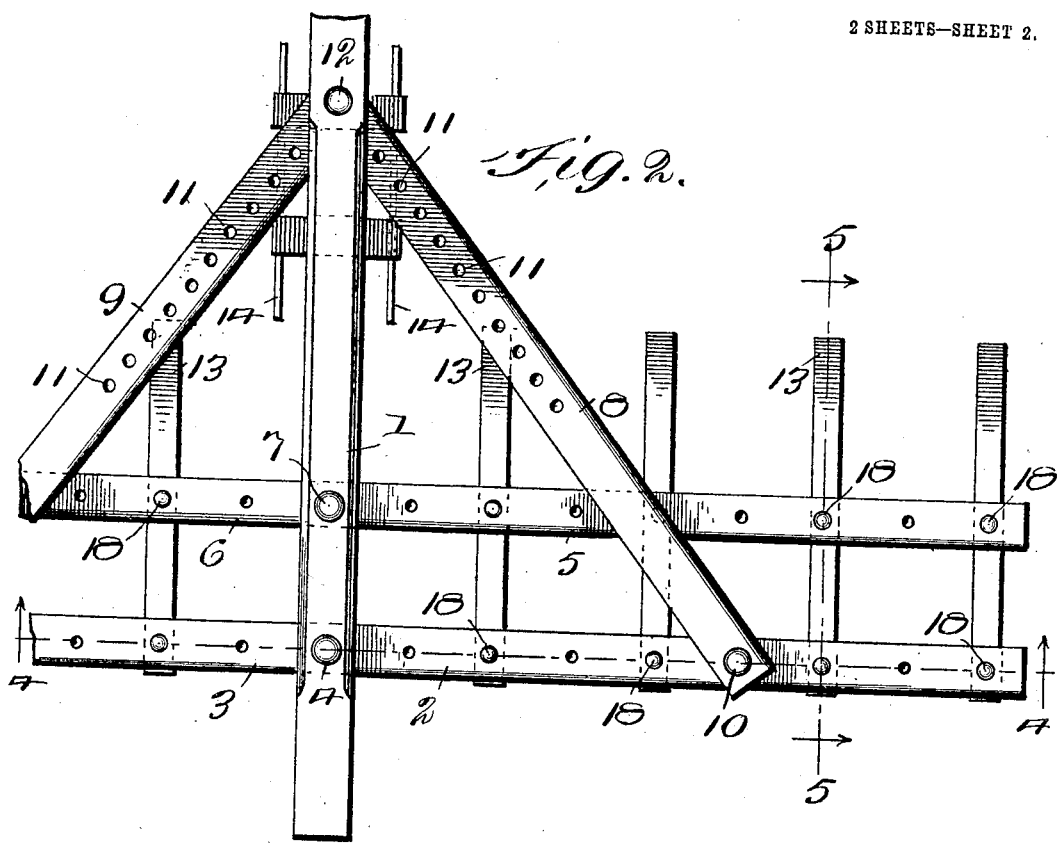
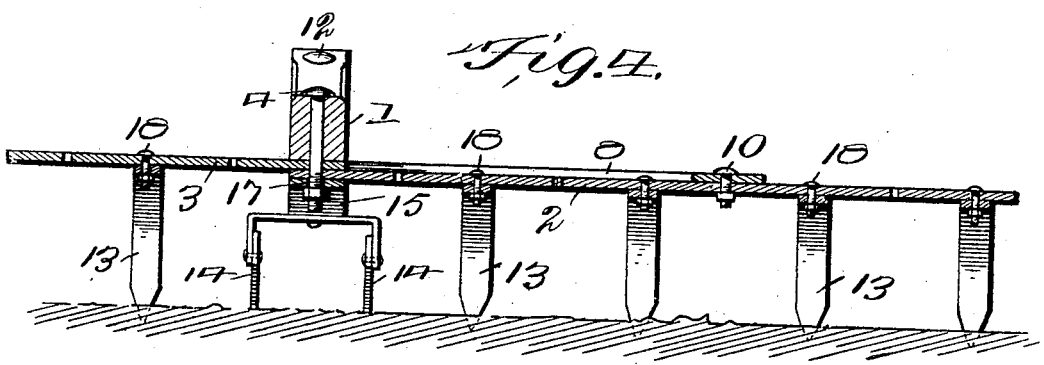
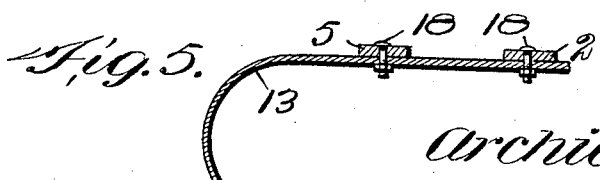
Witnesses
F. C. Barry
S. E. Fitzhall
Inventor
Archie B. Hyde
By W. T. Fitzgerald
Attorneys

UNITED STATES PATENT OFFICE.

ARCHIE B. HYDE, OF NEWNAN, GEORGIA.

COMBINED HARROW AND CULTIVATOR.

No. 795,442.　　　Specification of Letters Patent.　　　Patented July 25, 1905.

Application filed December 29, 1904. Serial No. 238,795.

*To all whom it may concern:*

Be it known that I, ARCHIE B. HYDE, a citizen of the United States, residing at Newnan, in the county of Coweta and State of Georgia, have invented certain new and useful Improvements in a Combined Harrow and Cultivator; and I do hereby declare the following to be a full, clear, and exact description of the invention, such as will enable others skilled in the art to which it appertains to make and use the same.

My invention relates to a combined harrow and cultivator; and it consists of certain novel features of construction and combination of parts, the preferred form whereof will be hereinafter clearly set forth, and pointed out in the claims.

The main object of my invention is to provide an implement of the character specified which may be used either as a harrow or as a cultivator or may be used combining both of said implements in one.

A further object of my invention is to provide great adjustability of the various parts, whereby the implement may be rendered desirable and efficient in serving as a harrow and also serving to cultivate growing crops, the adjustment being determined by the character of the work to be performed, so that very young and tender plants may be efficiently treated or full-grown plants may be cultivated, as will be hereinafter made fully apparent.

Other objects and advantages will be hereinafter made clearly apparent, reference being had to the accompanying drawings, which are considered a part of this application, and in which—

Figure 1 shows a perspective view of my invention complete ready for use as a cultivator. Fig. 2 shows a top plan view of my invention complete adjusted to serve as a harrow or cultivator, as desired. Fig. 3 is a longitudinal central sectional view of my improved harrow and cultivator. Fig. 4 is a sectional view of Fig. 2 on line 4 4 of said view. Fig. 5 is a sectional view of Fig. 2 on line 5 5.

For convenience of description the various details of my invention and coöperating accessories will be designated by numerals, the same numeral applying to a similar part throughout the several views.

Referring to the numerals on the drawings, 1 designates the main beam or frame-section, which may be made any desired size and of any suitable material, and preferably to the under side thereof I pivotally secure the outwardly-directed members 2 and 3, held in position by the bolt 4. I also provide the members 5 and 6, disposed parallel with the members 2 and 3 and held in proper relationship to the beam or frame-section 1 by the bolt 7 or the equivalent thereof. It will be noticed that the corresponding members 2 and 3 and 5 and 6 overlap where connected to the main beam 1. I also provide the bracing-sections 8 and 9, the forward ends of which are pivotally secured, as by suitable bolts 10, to the members 2 and 3, while the rear ends of said bracing-sections are provided with a plurality of apertures 11, whereby they may be adjustably secured to the frame-section 1 by a suitable locking-bolt 12, as clearly shown. The adjustable bars are pivotally connected by means of the bolts 4 and 7 to the beam or frame-section 1 and are provided with a plurality of teeth 13, any preferred number of teeth being employed, while the rear ends of the teeth are properly shaped or curved and sharpened, and in order to provide reliable means for protecting the young plants from being covered by the earth and clods falling from the teeth or cultivator-blades 13 I provide the members 14, having the forwardly-projecting spring-arm 15, the forward end of which is attached to the beam or frame-section 1 by means of the bolts 4 and 7 passing through the slots 16 and 17. These slots are elongated to enable the fenders 14 to be properly adjusted longitudinally relative to the frame of the machine.

I desire to call particular attention to the importance of the fenders or guard-blades 14, inasmuch as they serve a very valuable and important office—viz., that of protecting the young plants from being covered, as by the clods of earth, &c., plowed up by the teeth or blades 13, before explained. By the use of the fenders or guards 14 the operator is therefore enabled to drive my improved cultivator through the field without giving any special attention to the young plants cultivated thereby, inasmuch as any loosened earth-clods, &c., will fall against the outer sides of the members or guards 14, and said guards will prevent any damage resulting to the row of small plants, it being understood that the cultivator is to be driven through the field so that the row of plants will be beneath the beam 1 and with the fender or guard 14 on either side thereof.

By reference to Fig. 2 it will be seen that the parallel members 2 and 5 and also the parallel members 3 and 6 may be disposed so that they will stand outward at right angles to the beam or frame-section 1, or it will be observed by reference to Fig. 1 that said members may be so disposed or adjusted that they will occupy a plane which is oblique to the plane of the beam or frame member 1, said adjustment being readily effected by means of the bolt 12 and the plurality of apertures 11, provided in the bracing-sections 8 and 9.

The spring-arms 15, by means of which the carrying-runners 14 are connected with the frame of my cultivator and harrow, lend great resiliency in supporting the teeth 13, thereby insuring that they will perform their office in a thoroughly efficient and desirable manner.

Inasmuch as the teeth are pivotally connected to the members 2, 3, 5, and 6 by means of the rivets or bolts 18, it follows that said members may be quickly adjusted to occupy any desired angle relative to the beam or frame-section 1 and held in such adjusted position by the bracing members 8 and 9, thus fitting my implement as a cultivator when said members are disposed in the position illustrated in Fig. 1 or adapting the same as a harrow when said parts are disposed as shown in Fig. 2.

The various parts of my invention may be cheaply manufactured of any desired material and each readily assembled in its respective operative position, and while I have described the preferred combination and construction of parts I desire to comprehend in this application all such substantial equivalents and substitutes as may be considered as falling fairly within the scope and purview of my invention.

Having thus fully described my invention, what I claim as new, and desire to secure by Letters Patent, is—

1. The herein-described combined harrow and cultivator comprising a beam, oppositely-extending pairs of parallel members, the corresponding members of the pairs overlapping at one end, cultivator-teeth pivotally connected to the members, means for adjusting the members, a longitudinally-slotted spring-arm extending longitudinally of the beam, parallel, connected fenders secured thereto, and means extending through the beam, the overlapping ends of members and the slots of the arm for binding said parts together and securing the arm in adjusted position.

2. The herein-described combined harrow and cultivator comprising a beam, oppositely-disposed series of connected and longitudinally-adjustable teeth secured to the beam, connected parallel fenders, a spring-arm secured thereto, and means for securing both the arm and the series of teeth to the beam, said means holding the arm in adjusted position.

In testimony whereof I have signed my name to this specification in the presence of two subscribing witnesses.

ARCHIE B. HYDE.

Witnesses:
W. G. POST,
T. J. ENTREKEN.